US009157006B2

(12) United States Patent
Iwata et al.

(10) Patent No.: US 9,157,006 B2
(45) Date of Patent: Oct. 13, 2015

(54) COATING COMPOSITION AND COATED ARTICLE

(75) Inventors: Naoyuki Iwata, Hiratsuka (JP); Fumio Yamashita, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/342,575

(22) PCT Filed: Sep. 12, 2012

(86) PCT No.: PCT/JP2012/073348
§ 371 (c)(1),
(2), (4) Date: Mar. 4, 2014

(87) PCT Pub. No.: WO2013/047208
PCT Pub. Date: Apr. 4, 2013

(65) Prior Publication Data
US 2014/0200305 A1    Jul. 17, 2014

(30) Foreign Application Priority Data

Sep. 30, 2011  (JP) ................................. 2011-216232

(51) Int. Cl.
| | | |
|---|---|---|
| C09D 133/08 | (2006.01) | |
| C09D 133/14 | (2006.01) | |
| C09D 7/12 | (2006.01) | |
| C09D 175/04 | (2006.01) | |
| C09D 133/06 | (2006.01) | |
| C08G 18/62 | (2006.01) | |
| C08G 18/78 | (2006.01) | |
| C08G 18/79 | (2006.01) | |
| C08G 18/22 | (2006.01) | |
| C08K 3/00 | (2006.01) | |
| C08K 5/00 | (2006.01) | |

(52) U.S. Cl.
CPC ............ *C09D 133/08* (2013.01); *C08G 18/222* (2013.01); *C08G 18/6229* (2013.01); *C08G 18/7831* (2013.01); *C08G 18/7837* (2013.01); *C08G 18/792* (2013.01); *C08G 18/798* (2013.01); *C08K 3/0016* (2013.01); *C09D 7/12* (2013.01); *C09D 7/1216* (2013.01); *C09D 133/066* (2013.01); *C09D 133/14* (2013.01); *C09D 175/04* (2013.01); *C08K 5/0025* (2013.01); *C08K 5/0091* (2013.01)

(58) Field of Classification Search
CPC .. C09D 7/1216; C09D 7/1233; C09D 133/08; C09D 133/066; C09D 133/14
USPC .................................................. 525/123, 131
See application file for complete search history.

(56) References Cited

U.S. PATENT DOCUMENTS

| | | | |
|---|---|---|---|
| 4,732,957 A | 3/1988 | Schuster et al. | |
| 5,981,652 A | 11/1999 | Kawazu et al. | |
| 6,713,551 B2 | 3/2004 | Takahashi et al. | |
| 8,088,846 B2 * | 1/2012 | Hsieh et al. | 524/87 |
| 2006/0247341 A1 | 11/2006 | Hsieh et al. | |
| 2009/0011124 A1 | 1/2009 | Hsieh et al. | |
| 2009/0274846 A1 | 11/2009 | Wada et al. | |
| 2011/0052822 A1 * | 3/2011 | Chiga et al. | 427/407.1 |

FOREIGN PATENT DOCUMENTS

| | | |
|---|---|---|
| CN | 101528872 | 9/2009 |
| JP | 52-32998 | 3/1977 |
| JP | 60-190417 | 9/1985 |
| JP | 61-231017 | 10/1986 |
| JP | 4-173882 | 6/1992 |
| JP | 9-299869 | 11/1997 |
| JP | 10-101996 | 4/1998 |
| JP | 2002-97412 | 4/2002 |
| JP | 2005-225907 | 8/2005 |
| JP | 2011-68864 | 4/2011 |

OTHER PUBLICATIONS

International Search Report issued Dec. 25, 2012 in International (PCT) Application No. PCT/JP2012/073348.
Extended European Search Report dated Jul. 3, 2015, in the corresponding European Application No. 12836824.8.
Hydroxypropyl Acrylate CAS N°:25584-83-2, UNEP Publications; OECD SIDS, 2005, pp. 1-7.

* cited by examiner

*Primary Examiner* — Vu A Nguyen
(74) *Attorney, Agent, or Firm* — Wenderoth, Lind & Ponack, L.L.P.

(57) ABSTRACT

An object of the present invention is to provide a coating composition that has excellent curability at low temperatures and in a short period of time, and that also has satisfactory pot life (usable life) and makes it possible to obtain a cured coating film with an excellent finished appearance. The present invention provides a coating composition comprising a secondary hydroxy-containing acrylic resin (A), which is a copolymer of monomer components comprising 20 to 50% by mass of secondary hydroxy-containing polymerizable unsaturated monomer (a) and 50 to 80% by mass of at least one other polymerizable unsaturated monomer (b); a polyisocyanate compound (B); and an organometallic catalyst (C) containing a metallic compound (C1) in which the metal is a member selected from the group consisting of zinc, tin, zirconium, bismuth, lead, cobalt, manganese, titanium, aluminum and molybdenum, and an amidine compound (C2).

12 Claims, No Drawings

COATING COMPOSITION AND COATED ARTICLE

TECHNICAL FIELD

Cross Reference of Related Application

This application claims priority to Japanese Patent Application No. 2011-216232, filed on Sep. 30, 2011, the entire contents of which are incorporated by reference herein.

The present invention relates to a coating composition that is excellent in curability at low temperatures in a short period of time while maintaining pot life (usable time), and additionally that can form a cured coating film excellent in finished appearance.

BACKGROUND ART

From the standpoint of energy saving and reduction of environmental burdens, research toward the development of a shortened bake curing step and reduced operation steps has been actively conducted in the field of automotive body coating and industrial product coating.

For example, after electrodeposition coating, intercoating and top coating are typically provided in sequence, and bake curing has conventionally been performed following each of the intercoating and top coating. However, in an effort to reduce the operation steps in automotive body coating, there has been progress in research aimed at shortening the baking step by performing a single baking step for both the intercoating and top coating after the top coating is provided. This coating method comprising a shortened baking step is becoming the mainstream method.

With respect to shortening the bake curing step, there exists an increasing demand for lowering temperatures and shortening the time required for performing the step.

As a coating composition that meets the demand for low-temperature, short-time curing, hydroxyl/isocyanate-crosslinked coating compositions have been considered to be a strong candidate in view of cost efficiency. Hydroxyl/isocyanate-crosslinked coating compositions are obtained by crosslinking hydroxy-containing resins using a polyisocyanate compound as a crosslinking agent and curing the crosslinked resins. Thus, such compositions have been researched so far.

However, the prior art has been unsatisfactory in maintaining pot life (usable time, i.e., storage performance) in an attempt to improve the curability at low temperatures in a short period of time, and it has also been difficult to satisfy the requirement for an excellent appearance in automobile body coating and other kinds of coating.

Patent Literature 1 discloses as a coating composition excellent in curability at low temperatures a coating composition comprising as essential components a pyrazole-blocked polyisocyanate compound that contains per molecule two or more tertiary isocyanate groups blocked by a pyrazole compound, and a hydroxy-containing resin having a specific hydroxyl value and a specific weight average molecular weight. However, such a coating composition has been unsatisfactory in curability under short-time curing conditions.

Reference 2 discloses as a coating composition excellent in curability at low temperatures a one-package low-temperature-curing color enamel coating composition comprising: a resin component containing a polyester polyol having a specific hydroxy value and an acrylic polyol having a specific hydroxy value; a crosslinking agent containing a blocked isocyanate as an essential component and melamine as an optional component; a blocked isocyanate dissociation catalyst comprising at least a dicarboxylate of dibutyltin; and a pigment. However, this coating composition has been unsatisfactory in curability under low-temperature baking conditions.

Patent Literature 3 discloses a curable coating composition comprising a resin composition for preparing a coating composition and a (blocked) polyisocyanate compound, wherein the resin composition comprises a polyol (A1), a polyether polyol (B), and a solvent (C), wherein the polyol (A1) has a ring structure. Patent Literature 2 further discloses another curable coating composition comprising an organometallic compound and an acidic substance in addition to the aforementioned curable coating composition.

This coating composition is excellent in curability at low temperatures in a short period of time in an embodiment where the coating composition comprises an organometallic compound and an acidic substance; however, the pot life is unsatisfactory, and the finished appearance of the resulting coating film is also sometimes unsatisfactory.

CITATION LIST

Patent Literature

PTL 1: JP2005-225907A
PTL 2: JP10-101996A
PTL 3: JP2002-097412A

SUMMARY OF INVENTION

Technical Problem

An object of the present invention is to provide a coating composition that is excellent in curability at low temperatures in a short period of time while maintaining pot life (usable time), and additionally that can form a cured coating film excellent in finished appearance.

Solution to Problem

The present inventors conducted extensive research to solve the above problem. As a result, they found that the above object can be achieved by a coating composition that comprises a hydroxy-containing acrylic resin containing a specific secondary hydroxy-containing polymerizable unsaturated monomer as a copolymerization component, a polyisocyanate compound, and an organometallic catalyst containing a metallic compound selected from a specific range and an amidine compound.

More specifically, the present invention provides the following Items:

Item 1. A coating composition comprising:
a secondary hydroxy-containing acrylic resin (A), which is a copolymer of monomer components comprising 20 to 50% by mass of a secondary hydroxy-containing polymerizable unsaturated monomer (a) and 50 to 80% by mass of at least one other polymerizable unsaturated monomer (b);
a polyisocyanate compound (B); and
an organometallic catalyst (C) containing a metallic compound (C1) in which the metal is a member selected from the group consisting of zinc, tin, zirconium, bismuth, lead, cobalt, manganese, titanium, aluminum and molybdenum, and an amidine compound (C2);

wherein the equivalent ratio (NCO/OH) of isocyanate groups in the polyisocyanate compound (B) to hydroxy groups in the secondary hydroxy-containing acrylic resin (A) is in the range of 0.8 to 1.8.

Item 2. The coating composition according to Item 1, wherein the at least one other polymerizable unsaturated monomer (b) contains a $C_{6-20}$ alicyclic hydrocarbon-containing polymerizable unsaturated monomer (b1).

Item 3. The coating composition according to Item 1 or 2, wherein the secondary hydroxy-containing acrylic resin (A) has a weight average molecular weight in the range of 2,000 to 50,000.

Item 4. The coating composition according to any one of Items 1 to 3, wherein the metallic compound (C1) is a carboxylic acid metal salt compound.

Item 5. The coating composition according to any one of Items 1 to 4, wherein the content of the organometallic catalyst (C) is in the range of 0.05 to 5% by mass relative to the total mass of the secondary hydroxy-containing acrylic resin (A) and the polyisocyanate compound (B).

Item 6. The coating composition according to any one of Items 1 to 5, wherein the coating film formed therefrom has a glass transition temperature (Tg) in the range of 80 to 120° C.

Item 7. An article comprising a coating film formed by the application of the coating composition of any one of Items 1 to 6.

Advantageous Effects of Invention

The coating composition of the present invention comprises an organometallic catalyst that contains a metallic compound selected from a specific range and an amidine compound as a catalyst for a crosslinking reaction between a hydroxy-containing resin and a polyisocyanate compound, exhibiting excellent curability at low temperatures and in a short period of time, and, at the same time, attaining a satisfactory pot life.

This is presumably because the organometallic catalyst has a complex structure in which an amidine compound is coordinated to a metallic compound, and the amidine compound causes steric effects. Therefore, while the organometallic catalyst has a structure in which an amidine compound is coordinated, the catalytic activity for urethanization reaction that metallic compounds (metallic ions) inherently possess can be suppressed. This presumably allows a coating composition with excellent pot life to be obtained. Furthermore, the amidine compound dissociates at a relatively low temperature. Therefore, when it reaches this relatively low dissociation temperature, the coordinated amidine compound is eliminated, allowing the metallic compound to be reproduced. Here, due to the catalytic activity for urethanization reaction that metallic compounds (metallic ions) inherently possess, a coating composition having excellent curability at low temperatures and in a short period of time is presumably obtained.

Furthermore, the hydroxy-containing resin comprises a secondary hydroxy group, and the reaction rates of secondary hydroxy groups are slower compared to the primary hydroxy groups that are usually used as a hydroxy group. This presumably makes it possible to control the rate of the urethanization using a metallic compound as a catalyst to such an extent that a satisfactory finished quality can be ensured, forming a cured coating film with an excellent finished appearance.

As described above, the coating composition of the present invention achieves the effects of providing a coating composition that has excellent curability at low temperatures and in a short period of time, as well as a satisfactory pot life (usable life), and further makes it possible to form a cured coating film with an excellent finished appearance.

DESCRIPTION OF EMBODIMENTS

Hereunder, the coating composition of the present invention (which may be referred to as the present coating composition) is explained in detail.

The coating composition of the present invention comprises a hydroxy-containing acrylic resin containing a specific secondary hydroxy-containing polymerizable unsaturated monomer as a copolymerization component, a polyisocyanate compound, and an organometallic catalyst containing a metallic compound selected from a specific range and an amidine compound.

Secondary Hydroxy-Containing Acrylic Resin (A)

The secondary hydroxy-containing acrylic resin (A) can be prepared by copolymerizing monomer components comprising a secondary hydroxy-containing polymerizable unsaturated monomer (a) and at least one other polymerizable unsaturated monomer (b) by an ordinary method.

The secondary hydroxy-containing polymerizable unsaturated monomer (a) is a compound having one secondary carboxy group and one polymerizable unsaturated bond per molecule.

In light of the finished appearance of the coating film and the pot life of the coating composition, preferable examples of the secondary hydroxy-containing polymerizable unsaturated monomer (a) include polymerizable unsaturated monomers having a secondary hydroxy group whose alkyl group in the ester moiety has 2 to 8, particularly 3 to 6, and still more particularly 3 or 4 carbon atoms, such as 2-hydroxypropyl (meth)acrylate, 2-hydroxybutyl (meth)acrylate, and 3-hydroxybutyl (meth)acrylate; and adducts of (meth)acrylic acid with an epoxy-containing compound, e.g., "Cardura E10" (trade name, produced by Hexion Specialty Chemicals; a decanoic acid glycidyl ester). Among these, 2-hydroxypropyl (meth)acrylate is particularly preferable.

The monomers (a) may be used singly or in a combination of two or more.

In this specification, "(meth)acrylate" means "acrylate or methacrylate," and "(meth)acrylic acid" means "acrylic acid or methacrylic acid." Additionally, "(meth)acryloyl" means "acryloyl or methacryloyl."

The at least one other polymerizable unsaturated monomer (b) is a monomer other than the secondary hydroxy-containing polymerizable unsaturated monomer (a). Examples thereof include compounds having one polymerizable unsaturated bond per molecule. Specific examples of the unsaturated monomer (b) are listed in (1) to (8) below.

(1) Acid group-containing polymerizable unsaturated monomer

The acid group-containing polymerizable unsaturated monomer is a compound having one acid group and one polymerizable unsaturated bond per molecule. Specific examples of the monomer include carboxyl-containing monomers, such as (meth)acrylic acid, crotonic acid, itaconic acid, maleic acid, and maleic anhydride; sulfonic acid-containing monomers, such as vinyl sulfonic acid and sulfoethyl (meth)acrylate; and acidic phosphate monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid. These monomers may be used singly or in a combination of two or more. When an acid group-containing polymerizable unsaturated monomer is used, the acrylic resin (A) preferably has an acid value of about 0.5 to 30 mg KOH/g, and an acid value of about 1 to 20 mg KOH/g is particularly preferable.

(2) Hydroxy-containing (excluding secondary hydroxy groups) polymerizable unsaturated monomer The hydroxy-containing (excluding secondary hydroxy groups) polymerizable unsaturated monomer is a compound having one hydroxy group (excluding secondary hydroxy groups) and one polymerizable unsaturated bond per molecule. Examples of the monomer include monoesterified products (excluding those containing a secondary hydroxy group) of (meth)acrylic acid with a dihydric alcohol containing 2 to 10 carbon atoms, such as 2-hydroxyethyl (meth)acrylate, 3-hydroxypropyl (meth)acrylate, and 4-hydroxybutyl (meth)acrylate; and modified hydroxy-containing monomers (excluding those containing a secondary hydroxy group) obtained by subjecting an ε-caprolactone to a ring-opening polymerization reaction.

Examples of the modified hydroxy-containing monomer obtained by subjecting an ε-caprolactone to a ring-opening polymerization reaction include commercially available products, such as "Placcel FA-1," "Placcel FA-2," "Placcel FA-3," "Placcel FA-4," "Placcel FA-5," "Placcel FM-1," "Placcel FM-2," "Placcel FM-3," "Placcel FM-4," and "Placcel FM-5" (trade names, all manufactured by Daicel Chemical Industries Co., Ltd.), and the like.

(3) Esterified products of acrylic acid or methacrylic acid with a monohydric alcohol having 1 to 20 carbon atoms; for example, methyl(meth)acrylate, ethyl(meth)acrylate, propyl (meth)acrylate, butyl acrylate, n-butyl(meth)acrylate, iso-butyl(meth)acrylate, tert-butyl(meth)acrylate, 2-ethylhexyl (meth)acrylate, isooctyl(meth)acrylate, isomyristyl(meth)acrylate, stearyl(meth)acrylate, "Isostearyl Acrylate" (trade name, produced by Osaka Organic Chemical Industry, Ltd.), lauryl(meth)acrylate, tridecyl(meth)acrylate, stearyl(meth)acrylate, tetrahydrofurfuryl(meth)acrylate, cyclohexyl (meth)acrylate, isobornyl(meth)acrylate.

When an esterified product of acrylic acid or methacrylic acid with a monohydric alcohol having 1 to 20 carbon atoms is included as a constituent component, the proportion of the product preferably ranges from 10 to 60% by mass, and more preferably 15 to 50% by mass, based on the total amount of the monomer components.

Of the esterified products of acrylic acid or methacrylic acid with a monohydric alcohol having 1 to 20 carbon atoms, a $C_{6-20}$ alicyclic hydrocarbon-containing polymerizable unsaturated monomer (b1) can be used to improve both finished appearance and coating film curability.

Typical examples of the $C_{6-20}$ alicyclic hydrocarbon group include cyclohexyl, cyclooctyl, cyclododecyl, isobornyl, adamanthyl, tricyclo decanyl, and the like.

Examples of the unsaturated monomer (b1) include cycloalkyl(meth)acrylates, such as cyclohexyl(meth)acrylate, 4-methylcyclohexylmethyl(meth)acrylate, 4-ethylcyclohexylmethyl (meth)acrylate, 4-methoxy cyclohexylmethyl(meth)acrylate, tert-butylcyclohexyl(meth)acrylate, cyclooctyl(meth)acrylate, and cyclododecyl(meth)acrylate; polymerizable unsaturated monomers having a bridged alicyclic hydrocarbon group, such as isobornyl(meth)acrylate, tricyclodecanyl(meth)acrylate, adamantyl(meth)acrylate, 3,5-dimethyl adamantyl(meth)acrylate, and 3-tetracyclo dodecyl (meth)acrylate; etc.

When an unsaturated monomer (b1) is used, the proportion of the monomer preferably ranges from 10 to 60% by mass, more preferably 15 to 50% by mass, and even more preferably 20 to 45% by mass based on the total amount of the monomer components.

(4) Alkoxysilyl group-containing polymerizable unsaturated monomers: for example, vinyltrimethoxysilane, vinyltriethoxysilane, acryloxyethyl trimethoxysilane, methacryloxyethyl trimethoxysilane, acryloxypropyl trimethoxysilane, methacryloxypropyl trimethoxysilane, acryloxypropyl triethoxysilane, methacryloxypropyl triethoxysilane, vinyltris(β-methoxyethoxy)silane, and the like. Preferable examples of alkoxysilyl group-containing polymerizable unsaturated monomers include vinyltrimethoxysilane, γ-acryloxyprophyl trimethoxysilane, γ-methacryloxpropyl trimethoxysilane, and the like.

When an alkoxysilane group-containing polymerizable unsaturated monomer is used as a constituent component, crosslinkages may be formed, in addition to the crosslinkages of hydroxy groups and isocyanate groups, by a condensation reaction of alkoxysilane groups and a reaction of alkoxysilane groups and hydroxy groups. Thereby, the curability can be improved.

When the alkoxysilane group-containing polymerizable unsaturated monomer is included as a constituent component, the proportion of the monomer preferably ranges from 1 to 20% by mass, and more preferably 1 to 10% by mass, based on the total amount of the monomer components.

(5) Aromatic-based vinyl monomers: for example, styrene, α-methylstyrene, vinyltoluene, and the like.

When an aromatic-based polymerizable unsaturated monomer is included as a constituent component, the glass transition temperature of the resulting resin is raised and a hydrophobic coating film with a high refractive index can be obtained. This achieves an excellent finished appearance by improving the gloss of the coating film.

When an aromatic-based polymerizable unsaturated monomer is included as a constituent component, the proportion thereof preferably ranges from 3 to 40% by mass, and more preferably 5 to 30% by mass, based on the total amount of the monomer components.

(6) Glycidyl group-containing polymerizable unsaturated monomers: for example, compounds having one glycidyl group and one polymerizable unsaturated bond per molecule, such as glycidyl acrylate, glycidyl methacrylate, and the like.

(7) Compounds containing nitrogen and polymerizable unsaturated bond: for example, acrylamide, methacrylamide, dimethylacrylamide, N,N-dimethylpropylacrylamide, N-butoxymethylacrylamide, N-methylolacrylamide, N-methylolmethacrylamide, diacetone acrylamide, N,N-dimethylaminoethyl(meth)acrylate, vinylpyridine, vinylimidazol, acrylonitrile, methacrylonitrile, and the like.

(8) Other vinyl compounds: for example, vinyl acetate, vinyl propionate, vinyl chloride, vinyl versatates, and the like. Examples of vinyl versatates include commercially available products "VEOVA 9" and "VEOVA 10," produced by Japan Epoxy Resin Co., Ltd., and the like.

As at least one polymerizable unsaturated monomer (b), those listed in (1) to (8) above may be used singly or in a combination of two or more. The combinations of monomers listed in (1), (3), and (5) are preferable.

The weight average molecular weight of the acrylic resin (A) is preferably about 2,000 to 50,000, and more preferably about 5,000 to 30,000 to attain an excellent finished appearance and curability of the coating film.

The weight average molecular weight as used herein refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns, "TSK GEL G-4000HXL," "TSK GEL G-3000HXL,"

"TSK GEL G-2500HXL," and "TSK GEL G-2000HXL" (trade names; produced by Tosoh Corporation), under the following conditions: mobile phase: tetrahydrofuran, measuring temperature: 40° C., flow rate: 1 cc/min, and detector: RI.

The glass transition temperature of the acrylic resin (A) is preferably about −10 to 30° C., and more preferably about −5 to 20° C. to attain an excellent finished appearance and curability of the coating film.

In the present specification, the glass transition temperature (° C.) of the acrylic resin is calculated using the following formulae:

$$1/Tg(K)=(W1/T1)+(W2/T2)+\ldots \quad (i)$$

$$Tg(° C.)=Tg(K)-273 \quad (ii)$$

In each formula, W1, W2, ... represent the mass fractions of the monomers used for copolymerization, and T1, T2, ... represent the Tg (K) of the homopolymers of each of the monomers.

The proportion of each of the secondary hydroxy-containing polymerizable unsaturated monomer (a) and other polymerizable unsaturated monomer (b) is such that the secondary hydroxy-containing polymerizable unsaturated monomer (a) is preferably contained in an amount of about 20 to 50% by mass, and more preferably about 25 to 45% by mass, and that the other polymerizable unsaturated monomer (b) is preferably contained in an amount of about 50 to 80% by mass, and more preferably about 55 to 70% by mass based on the total monomer content. The curability and finished appearance of the cured coating film may be poor when the content of the secondary hydroxy-containing polymerizable unsaturated monomer (a) is less than 20% by mass, and when the content of the secondary hydroxy-containing polymerizable unsaturated monomer (a) exceeds 50% by mass, the finished appearance of the cured coating film may be poor.

To improve the finished appearance of the coating film, the secondary hydroxy-containing polymerizable unsaturated monomer (a) is preferably contained in an amount of 50 to 100% by mass, and more preferably 80 to 100% by mass based on the total amount of the hydroxy-containing polymerizable unsaturated monomer in the acrylic resin (A).

The hydroxy value of the acrylic resin (A) is 90 to 250 mg KOH/g, preferably 120 to 220 mg KOH/g, and more preferably 140 to 200 mg KOH/g to attain excellent curability.

The acid value of the acrylic resin (A) is preferably about 0.5 to 30 mg KOH/g, and more preferably about 1 to 20 mg KOH/g to attain excellent curability of the coating composition.

The secondary hydroxy-containing acrylic resin (A) can be obtained by copolymerizing a monomer mixture of the polymerizable unsaturated monomers (a) and (b).

The method for copolymerizing the monomer mixture to obtain a secondary hydroxy-containing acrylic resin (A) is not particularly limited, and known copolymerization methods can be used. Of these, a solution polymerization method, in which polymerization is conducted in an organic solvent in the presence of a polymerization initiator, is preferably used.

Examples of the organic solvent used in the solution polymerization method include toluene, xylene, Swasol 1000 (trade name, produced by Cosmo Oil Co., Ltd., an oil-based high-boiling-point solvent), and like aromatic-based solvents; ethyl acetate, butyl acetate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; propyl propionate, butyl propionate, ethoxyethyl propionate; and the like.

These organic solvents may be used singly, or in a combination of two or more. However, considering the solubility of the acrylic resin, high-boiling-point ester-based solvents or high-boiling-point ketone-based solvents are preferably used. A high-boiling-point aromatic-based solvent may be suitably used in combination.

Examples of the polymerization initiator used for copolymerizing the secondary hydroxy-containing acrylic resin (A) include known radical polymerization initiators, such as 2,2'-azobisisobutyronitrile, benzoyl peroxide, di-t-butyl peroxide, di-t-amyl peroxide, t-butyl peroctoate, 2,2'-azobis(2-methylbutyronitrile), and the like.

The secondary hydroxy-containing acrylic resins (A) can be used singly or in a combination of two or more.

In the coating composition of the present invention, resins other than the secondary hydroxy-containing acrylic resin (A) can be used in combination as necessary. Therefore, the coating composition of the present invention may include resins other than the secondary hydroxy-containing acrylic resin (A). Specific examples thereof include acrylic resins other than the acrylic resin (A), polyester resins, polyether resins, polyurethane resins, and the like. Preferable examples include hydroxy-containing polyester resins and hydroxy-containing polyurethane resins.

The hydroxy-containing polyester resin may be produced by a known method, for example, by an esterification reaction of a polybasic acid and polyhydric alcohol. The polybasic acid is a compound having at least two carboxyl groups per molecule, and examples thereof include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having at least two hydroxy groups per molecule, and examples thereof include diols, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, hydrogenation bisphenol A, and the like; trihydric or higher polyol components, such as trimethylolpropane, trimethylolethane, glycerin, pentaerythritol, and the like; and hydroxycarboxylic acids, such as 2,2-dimethylolpropionic acid, 2,2-dimethylolbutanoic acid, 2,2-dimethylolpentanoic acid, 2,2-dimethylolhexanoic acid, 2,2-dimethyloloctanoic acid, and the like.

Alternatively, a monoepoxy compound, such as propylene oxide, butylene oxide or a like α-olefin epoxide, or "Cardura E10" (trade name, produced by Japan Epoxy Resin Co., Ltd.; a synthetic highly branched saturated fatty acid glycidyl ester) may be reacted with an acid, and the resulting compound may be introduced into the polyester resin.

Carboxyl groups can be introduced into the polyester resin by, for example, adding an acid anhydride to a hydroxy-containing polyester for half-esterification.

The hydroxy-containing polyester resin preferably has a hydroxy value ranging from 100 to 250 mg KOH/g, and more preferably 120 to 220 mg KOH/g. The hydroxy-containing polyester resin preferably has a weight average molecular weight ranging from 2,500 to 40,000 and more preferably from 5,000 to 30,000.

Examples of hydroxy-containing polyurethane resins include hydroxy-containing polyurethane resins that are obtainable by a reaction of a polyol and a polyisocyanate.

Examples of polyols include low molecular weight polyols, such as ethylene glycol, diethylene glycol, propylene glycol, butylene glycol, hexamethylene glycol and like dihydric alcohols; trimethylolpropane, glycerol, pentaerythritol and like trihydric alcohols; and higher molecular weight polyols, such as polyether polyols, polyester polyols, acrylic polyols, epoxy polyols, and the like. Examples of polyether polyols include polyethylene glycol, polypropylene glycol, polytetramethylene glycol, and the like. Examples of polyester polyols include polycondensates of the dihydric alcohols described above, dipropylene glycol, 1,4-butanediol, 1,6-hexanediol, neopentyl glycol or like alcohols with a dibasic acid, such as adipic acid, azelaic acid, sebacic acid, or the like; polyols obtained by ring-opening polymerization of a lactone, such as polycaprolactone; polycarbonate diols; and the like. Further, for example, carboxy-containing polyols, such as 2,2-dimethylolpropionic acid, 2,2-dimethlolbutanoic acid, and the like, may also be utilized.

Examples of polyisocyanates to be reacted with such polyols include aliphatic polyisocyanate compounds, such as hexamethylene diisocyanate, trimethylhexamethylene diisocyanate, dimer acid diisocyanate, lysine diisocyanate, and the like; biuret adducts and isocyanurate ring adducts of such polyisocyanates; alicyclic diisocyanate compounds, such as isophorone diisocyanate, 4,4'-methylenebis(cyclohexylisocyanate), methylcyclohexane-2,4-(or -2,6-)diisocyanate, 1,3- (or 1,4-) di(isocyanatomethyl)cyclohexane, 1,4-cyclohexane diisocyanate, 1,3-cyclopentane diisocyanate, 1,2-cyclohexane diisocyanate, and the like; biuret adducts and isocyanurate ring adducts of such polyisocyanates; aromatic diisocyanate compounds, such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m-(or p-)phenylene diisocyanate, 4,4'-biphenylene diisocyanate, 3,3'-dimethyl-4,4'-biphenylene diisocyanate, bis(4-isocyanatophenyl)sulfone, isopropylidene bis(4-phenylisocyanate), and the like; biuret adducts and isocyanuric ring adducts of such polyisocyanates; polyisocyanate compounds having at least three isocyanate groups per molecule, such as triphenylmethane-4,4',4''-triisocyanate, 1,3,5-triisocyanatobenzene, 2,4,6-triisocyanatotoluene, 4,4'-dimethyldiphenylmethane-2,2',5,5'-tetraisocyanate, and the like; biuret adducts and isocyanurate ring adducts of such polyisocyanates; and the like.

The hydroxy-containing polyurethane resin preferably has a hydroxy value ranging from 100 to 250 mg KOH/g, and more preferably 120 to 220 mg KOH/g. The hydroxy-containing polyurethane resin preferably has a weight average molecular weight ranging from 2,500 to 40,000 and more preferably from 5,000 to 30,000. The hydroxy-containing polyurethane resin preferably has a glass transition temperature ranging from −40° C. to 85° C. and more preferably from −30° C. to 80° C.

When a resin other than the above secondary hydroxy-containing acrylic resin (A) (specifically, polyester resin, polyether resin, polyurethane resin, and the like.) is used in combination, the resin other than the secondary hydroxy-containing acrylic resin (A) is preferably contained in an amount of 100% by mass or less, and more preferably 10 to 50% by mass based on the total solids content of the secondary hydroxy-containing acrylic resin (A).

Polyisocyanate Compound (B)

The polyisocyanate compound (B) is a curing agent of the coating composition of the present invention, and has at least two isocyanate groups per molecule. Polyisocyanate compounds that have been generally employed in the production of polyurethane can be utilized. Examples of the polyisocyanate compound (B) include aliphatic polyisocyanates, alicyclic polyisocyanates, aliphatic-aromatic polyisocyanates, aromatic polyisocyantates, derivatives of these polyisocyanates, and the like.

Examples of aliphatic polyisocyanates include trimethylene diisocyanate, tetramethylene-1,4-diisocyanate, pentamethylene-1,5-diisocyanate, hexamethylene diisocyanate, 1,2-propylene diisocyanate, 1,2-butylene diisocyanate, 2,3-butylene diisocyanate, 1,3-butylene diisocyanate, 2,2,4-trimethylhexamethylene-1,6-diisocyanate, 2,6-diisocyanatomethylcaproate, lysine diisocyanate, and like aliphatic diisocyanates; lysine ester triisocyanates, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanate-5-isocyanato methyloctane, and like aliphatic triisocyanates; and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate and like alicyclic diisocyanates; 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1]heptane, 3-(3-isocyanatopropyl)-2,5-di(isocyanatomethyl)-bicyclo[2.2.1]heptane, 5-(2-isocyanatoethyl)-2-isocyantomethyl-3-(3-isocyanatopropyl)-bicyclo[2.2.1]heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, 6-(2-isocyanatoethyl)-2-isocyanatomethyl-2-(3-isocyanatopropyl)-bicyclo[2.2.1]heptane and like alicyclic triisocyanates; and the like.

Examples of aliphatic-aromatic polyisocyanates include 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof, and like aliphatic-aromatic diisocyanates; and 1,3,5-triisocyanate methylbenzene and like aliphatic-aromatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate, or a mixture thereof, 2,4- or 2,6-tolylene diisocyanate, or a mixture thereof, 4,4'-toluidine diisocyanate, 4,4'-diphenylether diisocyanate and like aromatic diisocyanates, for example, triphenylmethane-4,4',4''-triisocyanate, 1,3,5-triisocyanato benzene, 2,4,6-triisocyanato toluene and like aromatic triisocyanates, for example, 4,4'-diphenylmethane-2,2',5,5'-tetraisocyanate and like aromatic tetraisocyanates; and the like.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like, of the aforementioned polyisocyanate compounds.

Of these, hexamethylene diisocyanate (hereinbelow sometimes referred to as HMDI), isophorone diisocyanate (hereinbelow sometimes referred to as IPDI), and derivatives thereof are particularly preferably used because they are industrially readily available.

These polyisocyanate compounds may be used singly, or in a combination of two or more.

The viscosity of the polyisocyanate compound (B) at 25° C. is 200 to 4,000 mPa·s, preferably 250 to 3,500 mPa·s, and more preferably 300 to 3,000 mPa·s. The curability of the coating composition of the present invention may be reduced when the viscosity is less than 200 mPa·s. In contrast, when the viscosity exceeds 4,000 mPa·s, the finished appearance of the obtained coating film may be reduced.

As the polyisocyanate compound (B), those containing a dimer or higher multimer disocyanate compound can be preferably used to attain an excellent finished appearance and curability at a low temperature for a short period of time.

When the polyisocyanate compound (B) contains a dimer or higher multimer as mentioned above, a compound containing an isocyanurate trimer preferably in an amount of 30 to 70% by mass, more preferably 40 to 70% by mass, and even more preferably 50 to 70% by mass; a urethodione dimer preferably in an amount of 3 to 30% by mass, more preferably 5 to 25% by mass, and even more preferably 8 to 20% by mass; and other trimers or higher multimers preferably in an amount of 0 to 67% by mass, more preferably 5 to 55% by mass, and even more preferably 10 to 42% by mass, based on the total content of the polyisocyanate compound, can be preferably used.

The isocyanurate trimer is a polyisocyanate having an isocyanurate group comprising three diisocyanate monomers, and the urethodione dimer is a polyisocyanate having a urethodione group comprising two diisocyanate monomers.

It is preferable that a polyisocyanate compound does not contain an unreacted diisocyanate monomer. The concentration of the remaining diisocyanate monomer is preferably 1% by mass or less, and more preferably 0.5% by mass or less.

Organometallic Catalyst (C)

The organometallic catalyst (C) comprises a metallic compound (C1) and an amidine compound (C2).

The combined use of a metallic compound (C1) and an amidine compound (C2) contributes to excellent curability at low temperatures and in a short time period and to the excellent finished appearance of the formed coating film, and makes it possible to sufficiently maintain the pot life as a two-liquid-type coating composition.

The reason for this is considered to be as follows. The catalyst comprising a metallic compound (C1) and an amidine compound (C2) forms a complex structure, and the amidine compound serves as a blocking agent. The amidine compound as a blocking agent is dissociated at a low temperature. After dissociation of the amidine compound, the catalytic performance with excellent low-temperature curability inherent in the metallic compound is activated. The coating composition can thereby achieve both satisfactory pot life and curability at low temperatures and in a short time period.

The metallic compound (C1) contains metal that is a member selected from the group consisting of zinc, tin, zirconium, bismuth, lead, cobalt, manganese, titanium, aluminum, and molybdenum. Examples of the metallic compound include carboxylic acid metal salt compounds, acetylacetone metal complexes, and the like. In particular, carboxylic acid metal salt compounds can be preferably used.

Specific examples of carboxylic acid metal salt compounds include compounds represented by the following formula (1):

$$(RCO_2)_nM \qquad (1)$$

wherein M is a metal selected from the group consisting of Zn, Sn, Zr, Bi, Pb, Co, Mn, Ti, Al, and Mo; R is $C_{1-30}$ alkyl, $C_{5-10}$ aryl, or $C_{1-30}$ aralkyl or alkylaryl; n is an integer having a value of 1 or more and 4 or less. In the present invention, $C_{1-30}$ aralkyl or alkylaryl refers to aralkyl or alkylaryl wherein the alkyl moiety has 1 to 30 carbon atoms. Examples of aryl include $C_{5-10}$ aryl.

More specific examples include 2-ethylhexanoic acid (octylic acid) metal salts, acetic acid metal salts, naphthenic acid metal salts, benzoic acid metal salts, octanoic acid metal salts, lauric acid metal salts, stearic acid metal salts, neodecanoic acid metal salts, oleic acid metal salts, and the like.

In one embodiment of the present invention, examples of carboxylic acid metal salt compounds include compounds represented by the following formula (1'):

$$(R'CO_2)_nM \qquad (1')$$

wherein M is a metal selected from the group consisting of Zn, Sn, Zr, Bi, Pb, Co, Mn, Ti, Al, and Mo; R' is $C_{1-30}$ alkyl, or $C_{1-30}$ aralkyl or alkylaryl; and n is an integer having a value of 1 or more and 4 or less.

Examples of compounds represented by the formula (1') include 2-ethylhexanoic acid metal salts, acetic acid metal salts, naphthenic acid metal salts, octanoic acid metal salts, stearic acid metal salts, neodecanoic acid metal salts, oleic acid metal salts, and the like.

Preferred in terms of excellent catalytic activity and easy industrial availability are manganese octylate, tin octylate, cobalt octylate, titanium octylate, aluminum octylate, zinc octylate, zirconium octylate, bismuth octylate, lead octylate, zinc laurate, zinc dibenzoate, etc.

The amidine compound (C2) is an organic compound having a structure represented by $R^1$—$C(=NR^2)$—$NR^3R^4$. In this structure, a carbon (C) atom is bonded to one nitrogen atom via a double bond and to one nitrogen atom via a single bond.

In the structural formula (2): $R^1$—$C(=NR^2)$—$NR^3R^4$, $R^1$ is hydrogen, an optionally substituted organic group attached to carbon, or an optionally substituted amine group; specifically, an optionally substituted hydrocarbyl group or an optionally etherified hydroxyl group.

$R^2$ and $R^3$ are each independently hydrogen or an organic group attached to carbon, or are bonded to each other to form a heterocyclic ring (a heterocyclic ring with one or more heteroatoms or a fused bicyclic ring with one or more heteroatoms).

$R^4$ is hydrogen, an optionally substituted organic group attached to carbon, or an optionally substituted and optionally etherified hydroxyl group; preferably an optionally substituted hydrocarbyl group having 8 or more carbon atoms.

When $R^1$ or $R^4$ is an organic group, it may be an organic group having 1 to 40 carbon atoms or a polymer group having a molecular weight of, for example, 500 to 50,000.

The groups represented by $R^1$, $R^2$, $R^3$, and $R^4$ may each independently contain an alcoholic hydroxyl group as a substituent.

Specific examples of amidine compounds represented by the structural formula (2): $R^1$—$C(=NR^2)$—$NR^3R^4$, wherein $R^2$ and $R^3$ are not bonded to each other, include N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-(α-(decyliminoethyl)ethyl)pyrrolidine, N'-decyl-N,N-dimethylformamidine, N'-dodecyl-N,N-dimethylformamidine, N'-cyclohexyl-N,N-acetamidine, and the like.

Examples of the amidine compound (C2) also include amidine compounds having a structure in which $R^2$—$R^3$ form a 5- to 7-membered ring containing two nitrogen atoms in the amidine structure, and in which either $R^1$—$R^3$ or $R^1$—$R^4$ form a 5- to 9-membered ring together with one nitrogen atom in the amidine structure and a plurality of carbon atoms.

Specific examples of amidine compounds having such a structure include 1,5-diazabicyclo(4.3.0)non-5-ene, 1,8-diazabicyclo(5.4.0)undec-7-ene, 1,4-diazabicyclo(3.3.0)oct-4-ene, 2-methyl-1,5-diazabicyclo(4.3.0)non-5-ene, 2,7,8-trimethyl-1,5-diazabicyclo(4.3.0)non-5-ene, 2-butyl-1,5-diazabicyclo(4.3.0)non-5-ene, 1,9-diazabicyclo(6.5.0)tridec-8-ene, and the like.

Other examples of the amidine compounds include heterocyclic compounds of the structural formula (2): $R^1$—C(=$NR^2$)—$NR^3R^4$, wherein $R^2$ and $R^3$ are bonded to each other, such as imidazoline, imidazole, tetrahydropyrimidine, dihydropyrimidine, and pyrimidine.

An imidazole derivative is generally represented by the following structural formula:

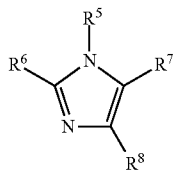

In this formula, $R^5$, $R^6$, $R^7$, and $R^8$ are each independently hydrogen, alkyl, substituted alkyl, hydroxyalkyl, allyl, aralkyl, cycloalkyl, a heterocyclic ring, ether, thioether, halogen, —$N(R)_2$, polyethylene polyamine, nitro, keto, ester, carbonamide, or these functional groups substituted with alkyl.

Specific examples of imidazole compounds include N-(2-hydroxyethyl)imidazole, N-(3-aminopropyl)imidazole, 4-(hydroxymethyl)imidazole, 1-(tert-butoxycarbonyl)imidazole, imidazole-4-propionic acid, 4-carboxylmidazole, 1-butylimidazole, 1-methylimidazole, 2-methyl-4-imidazolecarboxylic acid, 4-formylimidazole, 1-(ethoxycarbonyl)imidazole, reaction product of propylene oxide with imidazole and 2-methylimidazole, 1-trimethylsilyl imidazole, 4-(hydroxymethyl)imidazole hydrochloride, copolymer of 1-chloro-2,3-epoxypropane and imidazole, 1-(p-toluenesulfonyl)imidazole, 1,1-carbonylbisimidazole, 1-(2-cyanoethyl)-2-ethyl-4-methylimidazole, 2-phenyl-2-imidazoline pyromellitate, 4-(hydroxymethyl)imidazole picrate, disodium salt of 2-propenoic acid with 4,5-dihydro-2-nonyl-1H-imidazole-1-ethanol and 2-heptyl-4,5-dihydro-1H-imidazole-1-ethanol, 1-(cyanoethyl)-2-undecylimidazole trimellitate, 1-(2-hydroxypropyl)imidazole formate, sodium imidazolate, silver imidazolate, and the like.

These amidine compounds can be used singly or in a combination of two or more.

More specifically, in the present invention, the organometallic catalyst (C) is a metal complex, and the complex can be produced, for example, by heating 1 mol of a carboxylic acid metal salt and 2 mol of an amidine compound in a solvent, such as methanol.

In the above production, the mixture is maintained at about 50° C. for about 2 hours until it becomes a transparent solution, thereby forming a metal complex. The transparent solution is filtered and dried.

The molar ratio of the amidine compound (C2) to the metallic compound (C1) (the ratio of the number of moles of (C1) to the number of moles of (C2)) is preferably in the range of 1.3 to 8.0, more preferably 1.6 to 5.0, and even more preferably 1.8 to 4.0.

When the molar ratio is outside the range of 1.3 to 8.0, either one of the low-temperature short-time curability, pot life, and finished appearance may be insufficient.

From the viewpoint of low-temperature short-time curability, pot life, and finished appearance, the amount of the component (C) is preferably in the range of 0.05 to 5% by mass, more preferably 0.1 to 4% by mass, and even more preferably 0.3 to 3% by mass, relative to the total mass of the components (A) and (B).

When the amount is less than 0.05% by mass, low-temperature short-time curability may be insufficient. In contrast, when the amount is greater than 5% by mass, the finished appearances of the resulting coating film may not be satisfactory.

The organometallic catalyst (C) may be used after being dissolved in a solvent. Examples of solvents include, but are not limited to, alcohol solvents, such as ethylene glycol, diethylene glycol, dipropylene glycol, propylene glycol, and butanediol; hydrocarbons, such as toluene, xylene, mineral turpentine, and mineral spirit; esters, such as ethyl acetate, butyl acetate, methyl glycol acetate, and cellosolve acetate; ketones, such as methyl ethyl ketone, methyl isobutyl ketone, and cyclohexanone; glycol ether solvents, such as 3-ethoxyethyl propionate and 3-methoxybutyl acetate; organic solvents of amide compounds, such as N,N-dimethylformamide and N,N-dimethylacetamide; β-diketone solvents, such as acetylacetone and its fluorine-substituted derivatives; ketoester solvents, such as methyl acetoacetate and ethyl acetoacetate; and other solvents.

In addition to the organometallic catalyst (C), a catalyst other than the organometallic catalyst (C) can be used in the coating composition of the present invention, if necessary. Accordingly, the coating composition of the present invention may contain a catalyst other than the organometallic catalyst (C).

Catalysts other than the organometallic catalyst (C) are not particularly limited, as long as they are organic metals that are known as catalysts for polyurethane production. Specific examples thereof include organic tin catalysts, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate. Among these, stannous dioctoate and dibutyltin dilaurate are preferred.

In the coating composition of the present invention, the equivalent ratio of isocyanate groups in the polyisocyanate compound (B) to hydroxy groups in the secondary hydroxy-containing acrylic resin (A) (NCO/OH) is preferably in the range of 0.8 to 1.8, more preferably 0.8 to 1.2, and even more preferably 0.8 to 1.15, from the viewpoint of low-temperature short-time curability, the finished appearance of the resulting coating film, and the water resistance, acid resistance, etc., of the cured coating film.

The glass transition temperature (Tg) of the coating film formed from the coating composition of the present invention is preferably in the range of about 80 to 120° C., and more preferably about 90 to 110° C., from the viewpoint of improving the finished appearance of the resulting coating film.

In the present invention, the glass transition temperature (Tg) of the coating film is a value of the cured coating film determined by dynamic viscoelasticity measurement.

The dynamic viscoelasticity measurement was performed at a temperature increase rate of 3° C./min in a temperature range of 20 to 200° C. at a frequency of 11 Hz. In this measurement, the glass transition temperature (Tg: ° C.) of the coating film is a temperature at which tan δ is the maximum value. The dynamic viscoelasticity measuring device used was an FT Rheospectra DVE-V4 (trade name of a dynamic viscoelasticity measuring device, produced by Rheology Co. Ltd.).

Other Components

The coating composition of the present invention comprises a secondary hydroxy-containing acrylic resin (A), a polyisocyanate compound (B), and an organometallic catalyst (C) as essential components. The coating composition generally contains an organic solvent, and may further contain, if necessary, pigments, pigment dispersants, leveling agents, rheology control agents, ultraviolet absorbers, light stabilizers, plasticizers, and other coating composition additives generally used in the field of coating compositions. Accordingly, the coating composition of the present invention may contain such coating composition additives.

Any pigment can be used without limitation. Examples thereof include coloring pigments, such as titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; metallic pigments, such as aluminum powder, mica powder, and titanium oxide-coated mica powder; and the like.

These pigments can be used singly or in a combination of two or more. The pigment content, which varies depending on the type of pigment, is generally 0 to 200% by mass, and preferably about 1 to 100% by mass, based on the total solids content of the components (A), (B), and (C).

The coloring pigment content, which varies depending on the type of coloring pigment, is generally 0 to 150% by mass, and preferably about 1 to 100% by mass, based on the total solids content of the components (A), (B), and (C).

A known ultraviolet absorber can be used. Examples thereof include benzotriazole absorbers, triazine absorbers, salicylic acid derivative absorbers, benzophenone absorbers, and other ultraviolet absorbers.

The content of the ultraviolet absorber in the coating composition is generally in the range of 0 to 10% by mass, preferably 0.2 to 5% by mass, and more preferably 0.3 to 2% by mass, based on the total resin solids content, from the viewpoint of weather resistance and yellowing resistance.

A known light stabilizer can be used. For example, a hindered amine light stabilizer can be used.

The content of the light stabilizer in the coating composition is generally in the range of 0 to 10% by mass, preferably 0.2 to 5% by mass, and more preferably 0.3 to 2% by mass, based on the total resin solids content, from the viewpoint of weather resistance and yellowing resistance.

From the viewpoint of storage stability, the coating composition of the present invention is preferably in the form of a two-liquid-type coating composition in which the secondary hydroxy-containing acrylic resin (A) and the organometallic catalyst (C) are separated from the polyisocyanate compound (B). It is preferable to mix both components immediately before use.

Method of Applying the Coating Composition

The coating composition of the present invention can be applied to any substance. Examples thereof include steel plates, such as cold rolled steel plates, galvanized steel plates, zinc alloy-plated steel plates, stainless steel plates, and tinned steel plates; metal substrates, such as aluminum plates and aluminum alloy plates; and preferably various plastic materials, etc. Other examples include bodies of various vehicles, such as automobiles, two-wheeled vehicles, and cargo transporters, which are formed from the metal substrates or plastic materials mentioned above.

Moreover, the substrate may be a metal substrate or vehicle body mentioned above having a metal surface that has been subjected to phosphate treatment, chromate treatment, complex oxide treatment, or other surface treatment. The substrate may also be a metal substrate, vehicle body, etc., mentioned above, on which an undercoat coating film of any of various electrodeposition coating compositions, and/or an intermediate coating film is formed, or may be a plastic material, such as a bumper, on which a primer coating film is formed.

The method of applying the coating composition of the present invention is not particularly limited. For example, air spray coating, airless spray coating, rotary atomization coating, curtain coating, or other coating method can be used to form a wet coating film. In these coating methods, an electrostatic charge may be applied, if necessary. Of these methods, air spray coating is particularly preferred. The coating composition is generally preferably applied to a cured film thickness of about 10 to 50 μm.

When air spray coating, airless spray coating, or rotary atomization coating is performed, it is preferable to appropriately adjust, by using a solvent, such as an organic solvent, the viscosity of the coating composition in a viscosity range that is suitable for coating. The viscosity range is generally from about 15 to 60 seconds at 20° C. as measured by a Ford Cup #No. 4 viscometer.

The wet coating film obtained by applying the coating composition of the present invention to a substance is cured by heating. Heating can be performed by known heating means. For example, a drying furnace, such as a hot air furnace, an electric furnace, or an infrared induction heating furnace, can be used. The heating retention temperature (keeping temperature) is preferably in the range of 60 to 120° C., more preferably 70 to 110° C., and even more preferably 80 to 100° C., in terms of excellent curability at low temperatures. The heating retention time (keeping time) is preferably in the range of 5 to 15 minutes, more preferably 5 to 12 minutes, and even more preferably 5 to 10 minutes, because the coating composition of the present invention has excellent short-time curability.

The coating composition of the present invention, which makes it possible to obtain a cured coating film that has excellent curability at low temperatures and in a short time period as well as satisfactory pot life, and that exhibits an excellent finished appearance, can be suitably used as a top clear coating composition for general industrial products. In particular, the coating composition of the present invention can be suitably used as a coating composition for automobiles.

EXAMPLES

The present invention is described in more detail below with reference to Examples and Comparative Examples. However, the present invention is not limited to the following Examples. Also, in the following Examples, "part(s)" and "%" are based on mass, and the film thicknesses of coating films are based on the cured coating films.

Production of Hydroxy-Containing Acrylic Resin

Production Examples 1 to 13

In each Example, 31 parts of ethoxyethyl propionate was placed into a four-necked flask equipped with a stirrer, a thermometer, a condenser tube, and a nitrogen gas inlet, and heated to 155° C. under a nitrogen gas stream. After the temperature reached 155° C., the nitrogen gas stream was stopped, and a monomer mixture of the monomers and the polymerization initiator at the proportions shown in Table 1 below was added dropwise thereto over a period of 4 hours. Subsequently, aging was carried out at 155° C. for 2 hours under a nitrogen gas stream. The resulting product was then cooled to 100° C. and diluted with 32.5 parts (7.5 parts in only Production Example 10) of butyl acetate. Thereby, hydroxy-containing acrylic resins (A-1) to (A-13) having a solids content of 60% were obtained. Table 1 below shows the mass solids concentration (%) and resin properties of each of the obtained hydroxy-containing acrylic resins.

The glass transition temperature (° C.) values listed in Table 1 were calculated using the following formulae.

$$1/Tg(K) = (W1/T1) + (W2/T2) + \ldots$$

$$Tg(°C.) = Tg(K) - 273$$

In each formula, W1, W2, ... represent the mass fractions of the monomers used for copolymerization, and T1, T2, ... represent the Tg (K) of homopolymers of each of the monomers. The values shown in the column to the right side of each monomer name in Table 1 are the Tg (° C.) of the homopolymers of each of the monomers used for the above calculation.

The hydroxy-containing acrylic resins (A-10) to (A-13) are the resins used for the Comparative Examples.

TABLE 1

| | | | Production Example No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Hydroxy-containing Acrylic Resin (A-) | | | 1 | 2 | 3 | 4 | 5 | 6 | 7 | 8 | 9 | 10 | 11 | 12 | 13 |
| | | Tg° C. | | | | | | | | | | | | | |
| a | 2-Hydroxypropyl Acrylate | −60 | 38 | 23 | 46.6 | 38 | 38 | | 38 | 32 | 38 | 19 | 51 | | |
| | 2-Hydroxypropyl Methacrylate | 76 | | | | | | 42 | | | | | | | |
| | 2-Hydroxyethyl Acrylate | −60 | | | | | | | | 5 | | | | 34 | |
| | 4-Hydroxybutyl Acrylate | −60 | | | | | | | | | | | | | 42.2 |
| b1 | Isobornyl Acrylate | 95 | 30 | 45 | 30 | 30 | 30 | 10 | | 30 | | 30 | 28 | 30 | 30 |
| | Cyclohexyl Methacrylate | 66 | | | | | | | 30 | | | | | | |
| b (other than b1) | 2-Ethylhexyl Acrylate | −53 | 11 | 11 | 2.4 | 11 | 11 | 37 | 11 | 12 | 11 | 30 | 0 | 15 | 6.8 |
| | N-Butyl Acrylate | −54 | | | | | | | | | 30 | | | | |
| | Styrene | 100 | 20 | 20 | 20 | 20 | 20 | 10 | 20 | 20 | 20 | 20 | 20 | 20 | 20 |
| | Acrylic Acid | 106 | 1 | 1 | 1 | 1 | 1 | 1 | 1 | 1 | 1 | 1 | 1 | 1 | 1 |
| Di-t-amyl Peroxide (Initiator) | | | 4 | 1 | 4 | 9 | 1 | 4 | 4 | 4 | 4 | 4 | 4 | 4 | 4 |
| Resin Properties | Mass Solids Concentration (%) | | 60 | 60 | 60 | 60 | 60 | 60 | 60 | 60 | 60 | 60 | 60 | 60 | 60 |
| | Weight Average Molecular Weight | | 13000 | 30000 | 13000 | 5000 | 30000 | 13000 | 13000 | 13000 | 13000 | 13000 | 13000 | 13000 | 13000 |
| | Hydroxy Value (mg KOH/g) | | 164 | 99 | 201 | 164 | 164 | 163 | 164 | 162 | 164 | 82 | 220 | 164 | 164 |
| | Glass Transition Temperature (° C.) | | 0 | 24 | −1 | 0 | 0 | 17 | −5 | −5 | −36 | 2 | −4 | 1 | 0 |

Production of Organometallic Catalyst

Production Example 14

47 parts of ethyl-3-ethoxypropionate and 81.6 parts of Nikka Octhix Zinc(*1) (zinc octylate, produced by Nihon Kagaku Sangyo Co., Ltd., zinc content: 8% by mass) were placed into a reactor equipped with a stirrer, a condenser, a temperature controller, a nitrogen inlet tube, and a dropping funnel. The air in the reactor was replaced with nitrogen, and the mixture was heated to 50° C. Subsequently, 16.4 parts of 1-methylimidazole was added dropwise thereto while being stirred. After completion of the dropwise addition, the 50° C. temperature was maintained for 2 hours, and the reaction was terminated. The obtained organometallic catalyst (C-1) was a transparent liquid having a zinc content of 4.5% by mass.

Production Examples 15 to 30

Organometallic catalysts (C-2) to (C-17) having the compositions shown in Table 2 below were obtained in the same manner as in Production Example 14.

Nikka Octhix Tin (*2): trade name, tin octylate, tin content: 28%, produced by Nihon Kagaku Sangyo Co., Ltd.

Nikka Octhix Lead (*3): trade name, lead octylate, lead content: 24%, produced by Nihon Kagaku Sangyo Co., Ltd.

K-KAT 348 (*4): trade name, bismuth octylate, bismuth content: 25%, produced by King Industries Inc.

Nikka Octhix Cobalt (*5): trade name, cobalt octylate, cobalt content: 8%, produced by Nihon Kagaku Sangyo Co., Ltd.

Nikka Octhix Manganese (*6): trade name, manganese octylate, manganese content: 8%, produced by Nihon Kagaku Sangyo Co., Ltd.

Zinc Naphthenate (*7): zinc content: 10.1%, produced by Tokyo Chemical Industry Co., Ltd.

Zinc Acetylacetonate (*8): zinc content: 25%, produced by Showa Chemical Co., Ltd.

Zinc Dibenzoate (*9): zinc content: 21.3%, produced by Wako Pure Chemical Industries, Ltd.

Zinc Laurate (*10): zinc content: 14.1%, produced by Wako Pure Chemical Industries, Ltd.

DBN (*11): 1,5-diazabicyclo[4.3.0]non-5-ene

DBU (*12): 1,8-diazabicyclo[5.4.0]undec-7-ene

TABLE 2

| | | Production Example No. | | | | | | | | | | | | | | | |
|---|---|---|---|---|---|---|---|---|---|---|---|---|---|---|---|---|---|
| | | 14 | 15 | 16 | 17 | 18 | 19 | 20 | 21 | 22 | 23 | 24 | 25 | 26 | 27 | 28 | 29 | 30 |
| Organometallic Catalyst (C-) | | 1 | 2 | 3 | 4 | 5 | 6 | 7 | 8 | 9 | 10 | 11 | 12 | 13 | 14 | 15 | 16 | 17 |
| C1 | Nikka Octhix Zinc (*1) | 81.6 | | | | | | | | | | 81.6 | 81.6 | 81.6 | 81.6 | 81.6 | 81.6 | 81.6 |
| | Nikka Octhix Tin (*2) | | 41.6 | | | | | | | | | | | | | | | |
| | Nikka Octhix Lead (*3) | | | 86.3 | | | | | | | | | | | | | | |
| | K-KAT 348 (*4) | | | | 83.6 | | | | | | | | | | | | | |
| | Nikka Octhix Cobalt (*5) | | | | | 68.5 | | | | | | | | | | | | |
| | Nikka Octhix Manganese (*6) | | | | | | 69 | | | | | | | | | | | |
| | Zinc Naphthenate (*7) | | | | | | | 64.7 | | | | | | | | | | |
| | Zinc Acetylacetonate (*8) | | | | | | | | | 26.2 | | | | | | | | |
| | Zinc Dibenzoate (*9) | | | | | | | | | | 30.7 | | | | | | | |
| | Zinc Laurate (*10) | | | | | | | | | | | 46.4 | | | | | | |
| C2 | 1-Methyl Imidazole | 16.4 | 16.4 | 16.4 | 16.4 | 16.4 | 16.4 | 16.4 | 16.4 | 16.4 | 16.4 | | | | | 32.8 | 14.8 | |
| | 1-Butylimidazole | | | | | | | | | | | 24.8 | | | | | | |
| | DBN (*11) | | | | | | | | | | | | 24.8 | | | | | |
| | DBU (*12) | | | | | | | | | | | | | 30.4 | | | | |
| | Tetramethylguanidine | | | | | | | | | | | | | | 23 | | | |
| Ethyl-3-ethoxypropionate | | 47 | 205 | 358 | 364 | 46 | 36.6 | 64 | 102 | 98.2 | 82.6 | 39 | 39 | 33 | 41 | 31 | 49 | 63 |
| Molar Ratio of (C2) to (C1) | | 2 | 2 | 2 | 2 | 2 | 2 | 2 | 2 | 2 | 2 | 2 | 2 | 2 | 2 | 4 | 1.8 | |
| Metal Concentration by Mass (%) | | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |

Table 2 below also shows the molar ratio of amidine compound (C2) to metallic compound (C1) and the metal concentration by mass (%) of each of the organometallic catalysts (C-1) to (C-17).

The organometallic catalyst (C-17) is a catalyst used for a Comparative Example.

The notes (*1) to (*12) in Table 2 are as follows.

Nikka Octhix Zinc (*1): trade name, zinc octylate, zinc content: 8%, produced by Nihon Kagaku Sangyo Co., Ltd.

Production of Coating Compositions

Examples 1 to 32 and Comparative Examples 1 to 6

The hydroxy-containing acrylic resins obtained in Production Examples 1 to 13, the organometallic catalysts obtained in Production Examples 14 to 30, and the starting materials listed in Table 3 below were used. Coating compositions Nos. 1 to 38 were prepared by mixing components in the proportions shown in Table 3 below while being stirred using a blade stirrer to obtain coating compositions. In Table 3, the proportions of the coating composition components are expressed as mass ratios of the components on a solids basis.

The polyisocyanate compounds (B-1) to (B-7) in Table 3 refer to the following.

Polyisocyanate compound (B-1): a polyisocyanate compound derived from hexamethylene diisocyanate, composition ratio of multimers: isocyanurate trimer (53%) and other trimer(s) or higher multimer(s) (47%), solids content: 100%, NCO content: 21.8%, viscosity at 25° C.: 3000 mPa·s.

Polyisocyanate compound (B-2): a polyisocyanate compound derived from hexamethylene diisocyanate, composition ratio of multimers: isocyanurate trimer (63%), urethodione dimer (12%), and other trimer(s) or higher multimer(s) (25%), solids content: 100%, NCO content: 21.8%, viscosity at 25° C.: 500 mPa·s.

Polyisocyanate compound (B-3): a polyisocyanate compound derived from hexamethylene diisocyanate, composition ratio of multimers: isocyanurate trimer (45%), urethodione dimer (25%), and other trimer(s) or higher multimer(s) (30%), solids content: 100%, NCO content: 21.8%, viscosity at 25° C.: 340 mPa·s.

Polyisocyanate compound (B-4): a polyisocyanate compound derived from hexamethylene diisocyanate; composition ratio of multimers: isocyanurate trimer (27%), urethodione dimer (37%), and other trimer(s) or higher multimer(s) (36%); solids content: 100%; NCO content: 21.8%; viscosity at 25° C.: 180 mPa·s.

Polyisocyanate compound (B-5): N3200, trade name, produced by Bayer, biuret of hexamethylene diisocyanate, solids content: 100%, NCO content: 23.0%, viscosity at 25° C.: 2500 mP·s.

Polyisocyanate compound (B-6): XP2580, trade name, produced by Bayer, allophanate of hexamethylene diisocyanate, solids content: 100%, NCO content: 19.5%, viscosity at 25° C.: 450 mP·s.

Polyisocyanate compound (B-7): Z4470, trade name, produced by Bayer, isocyanurate of isophorone diisocyanate, solids content: 70%, NCO content 11.9%, viscosity at 25° C.: 600 mP·s.

By adding butyl acetate, the coating compositions Nos. 1 to 38 obtained in Examples 1 to 32 and Comparative Examples 1 to 6 were adjusted to have a viscosity of 25 seconds at 20° C. using Ford Cup #No. 4.

The following tests were performed for the obtained coating compositions and individual test plates obtained by applying each coating composition.

NCO conversion: Using an FT-IR device, "FT/1R-420" (produced by JASCO Corporation), the NCO conversion was evaluated by a liquid membrane method immediately after mixing the components of each coating composition and adjusting the viscosity, and by measuring the surface of each test plate by the ATR method after heat-curing (maintained at 100° C. for 7 minutes). The NCO conversion was determined by calculating the isocyanate peak (1690 cm$^{-1}$) intensity and isocyanurate peak (2271 cm$^{-1}$) intensity and calculating the ratio of these intensities.

NCO conversion (%)=100−NCO residual ratio (%)

NCO residual ratio (%)=(isocyanate peak intensity after heat-curing/isocyanurate peak intensity after heat-curing)/(isocyanate peak intensity immediately after mixing components of coating composition/isocyanurate peak intensity immediately after mixing components of coating composition)×100

Usable time (pot life): As described above, the viscosity at 20° C. of each of the produced and viscosity-adjusted coating compositions was measured initially, after 4 hours, and after 6 hours, using Ford Cup #No. 4. The term "gel" in Table 3 below means that gelling occurred.

Coating film Tg (° C.): The coating compositions that had been produced in the above Examples and Comparative Examples and whose viscosity had been adjusted were individually applied to degreased tin plates by air-spraying to a film thickness of 40 μm and cured by heating at 100° C. for 7 minutes (the time during which the coated plates were maintained at 100° C.). Subsequently, the resulting coating films were peeled, and thus rectangular (0.5×2 cm) released films were prepared. Using the thus-obtained films as samples, the dynamic viscoelasticity was determined.

The dynamic viscoelasticity was determined at a temperature increase rate of 3° C./minute in the temperature range of 20 to 200° C. at a frequency of 11 Hz, by measuring Tg (° C.) (glass transition temperature (the temperature at which tan δ shows the maximum value)). For measuring the dynamic viscoelasticity, an FT Rheospectra DVE-V4 (produced by Rheology Co., Ltd., trade name, a device for measuring dynamic viscoelasticity) was used.

Preparation of Test Plates

Elecron GT-10 (produced By Kansai Paint Co., Ltd., trade name, a thermosetting epoxy resin-based cationic electrodeposition coating composition) was applied by electrodeposition to 0.8-mm thick dull steel plates treated by chemical conversion with zinc phosphate so as to have a film thickness of 20 μm, and the resulting films were cured by heating at 170° C. for 30 minutes. On the coating films, Amilac TP-65-2 (produced By Kansai Paint Co., Ltd., trade name, a polyester/melamine resin intermediate coating composition for automobiles, coating color: white) was applied by air-spraying to a film thickness of 35 μm, and cured by heating at 140° C. for 30 minutes. The coating compositions that had been produced in the above Examples and Comparative Examples and whose viscosity had been adjusted were individually applied to the resulting coating films to a film thickness of 40 μm. The thus-obtained coating films were allowed to stand at room temperature for 7 minutes and then cured by heating at 100° C. for 7 minutes (the time during which the coated plates were maintained at 100° C.), thereby preparing test plates.

Knoop hardness: After each test plate was allowed to stand in a thermostatic room at 20° C. for 24 hours, the "Tukon hardness" was measured using a Tukon tester (produced By American Chain & Cable Company, micro hardness tester).

Tukon hardness, also called the "Knoop Hardness Number (KHN)," is a value expressing the hardness of a coating film, and is determined by pressing a square pyramidal diamond indenter with a specific load into the surface of a test material, and measuring the size of the diamond-shaped indentation in the surface. The higher the Tukon hardness value, the greater the hardness. The Knoop hardness is preferably 7 or more.

Finished appearance: A brightness/darkness pattern of light on the surface of the coating film of each test plate was optically scanned to determine the longterm waviness measured in the wavelength region of 600 to 1000 μm and short term waviness measured in the wavelength region of 100 to 600 μm by using a "Wave-Scan" produced by BYK, which is a device for analyzing the contrast (intensity) of reflected light. The longterm waviness and shortterm waviness were evaluated as parameters for finished texture. They are variances of measured light intensity. The smaller the variances, the better the finished texture (smoothness of the coated surface).

Table 3 below shows the test results and the proportions of the coating composition components.

TABLE 3

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Coating Composition No. | | 1 | 2 | 3 | 4 | 5 | 6 | 7 | 8 | 9 | 10 | 11 | 12 | 13 | 14 | 15 |
| Hydroxy-Containing Acrylic Resin (A) | Resin Name (A-) | 1 | 1 | 1 | 2 | 3 | 4 | 5 | 6 | 7 | 8 | 9 | 1 | 1 | 1 | 1 |
| | Amount (Parts) | 64 | 60 | 64 | 75 | 59 | 64 | 64 | 64 | 64 | 64 | 64 | 64 | 64 | 64 | 64 |
| Polyisocyanate Compound (B) | B-1 | 36 | 40 | 36 | 25 | 41 | 36 | 36 | 36 | 36 | 36 | 36 | 36 | 36 | 36 | 36 |
| | B-2 | | | | | | | | | | | | | | | |
| | B-3 | | | | | | | | | | | | | | | |
| | B-4 | | | | | | | | | | | | | | | |
| | B-5 | | | | | | | | | | | | | | | |
| | B-6 | | | | | | | | | | | | | | | |
| | B-7 | | | | | | | | | | | | | | | |
| NCO/OH Ratio | | 1 | 1.2 | 1 | 1 | 1 | 1 | 1 | 1 | 1 | 1 | 1 | 1 | 1 | 1 | 1 |
| Organometallic Catalyst (C) | Catalyst Name (C-) | 1 | 1 | 1 | 1 | 1 | 1 | 1 | 1 | 1 | 1 | 1 | 2 | 3 | 4 | 5 |
| | Amount (Parts) | 1.0 | 1.0 | 0.5 | 1.0 | 1.0 | 1.0 | 1.0 | 1.0 | 1.0 | 1.0 | 1.0 | 0.5 | 0.5 | 0.5 | 1.0 |
| NCO Conversion (%) | | 87 | 83 | 82 | 91 | 85 | 91 | 85 | 85 | 87 | 93 | 89 | 94 | 91 | 90 | 88 |
| Coating Film Tg (° C.) | | 98 | 95 | 93 | 88 | 107 | 90 | 102 | 110 | 95 | 100 | 84 | 99 | 100 | 97 | 98 |
| Usable Time Pot Life seconds | Initial | 25 | 25 | 25 | 25 | 25 | 25 | 25 | 25 | 25 | 25 | 25 | 25 | 25 | 25 | 25 |
| | After 4 Hours | 29 | 28 | 27 | 27 | 28 | 29 | 28 | 29 | 27 | 27 | 29 | 28 | 28 | 29 | 30 |
| | After 6 Hours | 33 | 34 | 31 | 31 | 36 | 33 | 35 | 35 | 33 | 35 | 32 | 36 | 34 | 36 | 35 |
| Knoop Hardness | | 13 | 12 | 12 | 8 | 14 | 11 | 14 | 15 | 13 | 14 | 11 | 13 | 13 | 13 | 12 |
| Finished Appearance | Longterm Waviness | 2 | 3 | 1 | 1 | 4 | 1 | 4 | 2 | 1 | 4 | 2 | 3 | 3 | 3 | 1 |
| | Shortterm Waviness | 12 | 14 | 10 | 11 | 15 | 11 | 15 | 13 | 10 | 15 | 11 | 14 | 14 | 13 | 11 |

| | | Example | | | | | | | | | | | | | | | |
|---|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 | 31 | 32 |
| Coating Composition No. | | 16 | 17 | 18 | 19 | 20 | 21 | 22 | 23 | 24 | 25 | 26 | 27 | 28 | 29 | 30 | 31 | 32 |
| Hydroxy-Containing Acrylic Resin (A) | Resin Name (A-) | 1 | 1 | 1 | 1 | 1 | 1 | 1 | 1 | 1 | 1 | 1 | 1 | 1 | 1 | 1 | 1 | 1 |
| | Amount (Parts) | 64 | 64 | 64 | 64 | 64 | 64 | 64 | 64 | 64 | 64 | 64 | 64 | 64 | 65 | 61 | 63 | 64 |
| Polyisocyanate Compound (B) | B-1 | 36 | 36 | 36 | 36 | 36 | 36 | 36 | 36 | 36 | 36 | 36 | | | | | 29 | 18 |
| | B-2 | | | | | | | | | | | | 36 | | | | | |
| | B-3 | | | | | | | | | | | | | 36 | | | | |
| | B-4 | | | | | | | | | | | | | | | | | 18 |
| | B-5 | | | | | | | | | | | | | | 35 | | | |
| | B-6 | | | | | | | | | | | | | | | 39 | | |
| | B-7 | | | | | | | | | | | | | | | | | 7.4 |
| NCO/OH Ratio | | 1 | 1 | 1 | 1 | 1 | 1 | 1 | 1 | 1 | 1 | 1 | 1 | 1 | 1 | 1 | 1 | 1 |
| Organometallic Catalyst (C) | Catalyst Name (C-) | 6 | 7 | 8 | 9 | 10 | 11 | 12 | 13 | 14 | 15 | 16 | 1 | 1 | 1 | 1 | 1 | 1 |
| | Amount (Parts) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| NCO Conversion (%) | | 88 | 90 | 87 | 82 | 83 | 87 | 89 | 87 | 87 | 83 | 90 | 91 | 92 | 84 | 89 | 85 | 92 |
| Coating Film Tg (° C.) | | 98 | 97 | 97 | 94 | 95 | 100 | 99 | 100 | 97 | 95 | 100 | 95 | 91 | 97 | 99 | 108 | 91 |
| Usable Time Pot Life seconds | Initial | 25 | 25 | 25 | 25 | 25 | 25 | 25 | 25 | 25 | 25 | 25 | 25 | 25 | 25 | 25 | 25 | 25 |
| | After 4 Hours | 30 | 29 | 30 | 27 | 27 | 29 | 29 | 28 | 28 | 27 | 28 | 27 | 29 | 29 | 28 | 27 | 30 |
| | After 6 Hours | 32 | 31 | 34 | 29 | 30 | 34 | 35 | 37 | 33 | 30 | 37 | 31 | 30 | 35 | 31 | 32 | 33 |
| Knoop Hardness | | 12 | 11 | 12 | 12 | 12 | 13 | 13 | 13 | 13 | 12 | 13 | 14 | 11 | 13 | 13 | 14 | 12 |
| Finished Appearance | Longterm Waviness | 1 | 1 | 2 | 2 | 2 | 1 | 3 | 4 | 1 | 1 | 4 | 2 | 2 | 2 | 2 | 2 | 2 |
| | Shortterm Waviness | 10 | 10 | 13 | 11 | 12 | 12 | 14 | 15 | 11 | 11 | 15 | 12 | 12 | 13 | 12 | 13 | 12 |

| | | Comparative Example | | | | | |
|---|---|---|---|---|---|---|---|
| | | 1 | 2 | 3 | 4 | 5 | 6 |
| Coating Composition No. | | 33 | 34 | 35 | 36 | 37 | 38 |
| Hydroxy-Containing Acrylic Resin (A) | Resin Name (A-) | 10 | 11 | 12 | 13 | 1 | 1 |
| | Amount (Parts) | 78 | 57 | 64 | 64 | 72 | 64 |
| Polyisocyanate Compound (B) | B-1 | 22 | 43 | 36 | 36 | 28 | 36 |
| | B-2 | | | | | | |
| | B-3 | | | | | | |
| | B-4 | | | | | | |
| | B-5 | | | | | | |
| | B-6 | | | | | | |
| | B-7 | | | | | | |
| NCO/OH Ratio | | 1 | 1 | 1 | 1 | 0.7 | 1 |

TABLE 3-continued

| Organometallic Catalyst (C) | Catalyst Name (C-) | 1 | 1 | 1 | 1 | 1 | 17 |
|---|---|---|---|---|---|---|---|
| | Amount (Parts) | 1.0 | 1.0 | 1.0 | 1.0 | 1.0 | 1.0 |
| NCO Conversion (%) | | 92 | 81 | 93 | 97 | 95 | 91 |
| Coating Film Tg (° C.) | | 70 | 105 | 102 | 90 | 75 | 102 |
| Usable Time | Initial | 25 | 25 | 25 | 25 | 25 | 25 |
| Pot Life | After 4 Hours | 28 | 48 | gel | gel | 27 | gel |
| seconds | After 6 Hours | 32 | gel | gel | gel | 31 | gel |
| Knoop Hardness | | 6 | 14 | 13 | 9 | 5 | 13 |
| Finished Appearance | Longterm Waviness | 1 | 5 | 5 | 7 | 1 | 5 |
| | Shortterm Waviness | 10 | 20 | 22 | 30 | 10 | 21 |

The invention claimed is:

1. A coating composition comprising:
   a secondary hydroxy-containing acrylic resin (A), which is a copolymer of monomer components comprising 20 to 50% by mass of a secondary hydroxy-containing polymerizable unsaturated monomer (a) and 50 to 80% by mass of at least one other polymerizable unsaturated monomer (b);
   a polyisocyanate compound (B); and
   an organometallic catalyst (C) containing a metallic compound (C1) in which the metal is a member selected from the group consisting of zinc, tin, zirconium, bismuth, lead, cobalt, manganese, titanium, aluminum and molybdenum, and an amidine compound (C2),
   wherein the equivalent ratio (NCO/OH) of isocyanate groups in the polyisocyanate compound (B) to hydroxy groups in the secondary hydroxy-containing acrylic resin (A) is in the range of 0.8 to 1.8.

2. The coating composition according to claim 1, wherein the at least one other polymerizable unsaturated monomer (b) contains a $C_{6-20}$ alicyclic hydrocarbon-containing polymerizable unsaturated monomer (b1).

3. The coating composition according to claim 1, wherein the secondary hydroxy-containing acrylic resin (A) has a weight average molecular weight in the range of 2,000 to 50,000.

4. The coating composition according to claim 1, wherein the metallic compound (C1) is a carboxylic acid metal salt compound.

5. The coating composition according to claim 1, wherein the content of the organometallic catalyst (C) is in the range of 0.05 to 5% by mass relative to the total mass of the secondary hydroxy-containing acrylic resin (A) and the polyisocyanate compound (B).

6. The coating composition according to claim 1, wherein the coating film formed therefrom has a glass transition temperature (Tg) in the range of 80 to 120° C.

7. An article comprising a coating film formed by the application of the coating composition of claim 1.

8. An article comprising a coating film formed by the application of the coating composition of claim 2.

9. An article comprising a coating film formed by the application of the coating composition of claim 3.

10. An article comprising a coating film formed by the application of the coating composition of claim 4.

11. An article comprising a coating film formed by the application of the coating composition of claim 5.

12. An article comprising a coating film formed by the application of the coating composition of claim 6.

* * * * *